(12) United States Patent
Shiga

(10) Patent No.: US 8,979,039 B2
(45) Date of Patent: Mar. 17, 2015

(54) CLAMP

(75) Inventor: Kouki Shiga, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 14/236,983

(22) PCT Filed: Feb. 23, 2012

(86) PCT No.: PCT/JP2012/054358
§ 371 (c)(1),
(2), (4) Date: Feb. 4, 2014

(87) PCT Pub. No.: WO2013/035355
PCT Pub. Date: Mar. 14, 2013

(65) Prior Publication Data
US 2014/0217244 A1    Aug. 7, 2014

(30) Foreign Application Priority Data

Sep. 8, 2011  (JP) .................................. 2011-195627

(51) Int. Cl.
*F16L 3/00* (2006.01)
*B60R 16/02* (2006.01)
*F16L 55/035* (2006.01)
*H02G 3/32* (2006.01)
*F16B 21/16* (2006.01)

(52) U.S. Cl.
CPC ........... *B60R 16/0215* (2013.01); *F16L 55/035* (2013.01); *H02G 3/32* (2013.01); *F16B 21/16* (2013.01)
USPC ........... 248/73; 248/74.4; 174/40 CC; 24/487

(58) Field of Classification Search
USPC ....................... 248/49, 58, 62, 73, 74.2, 74.4; 174/40 CC, 72 A; 24/487
See application file for complete search history.

(56) References Cited

U.S. PATENT DOCUMENTS 4,550,891 A * 11/1985 Schaty .......................... 248/68.1
4,842,237 A *  6/1989 Wollar ............................ 248/548

(Continued)

FOREIGN PATENT DOCUMENTS

JP        64-36709      3/1989
JP        2001-56070    2/2001

(Continued)

OTHER PUBLICATIONS

International Search Report, mail date is May 1, 2012.

*Primary Examiner* — Bradley Duckworth
(74) *Attorney, Agent, or Firm* — Greenblum & Bernstein, P.L.C.

(57) ABSTRACT

A clamp has a configuration in which a first portion and a second portion having a pair of semicircular inner surfaces are coupled with a thin-walled hinge, a locking portion and a locked portion are provided on free ends of the first and the second portions, the locking portion and the locked portion being lockable to each other, clamping the metal pipe inserted between the semicircular inner surfaces of the first and the second portions. An attaching hole into which an attaching member protruding from the vehicle body can be inserted and locked thereto is provided on the first portion, an opening is provided in a partition portion that separates the attaching hole and the semicircular inner surfaces, a swinging piece projects into the opening, an attaching member contact projection is provided on one side of the swinging piece, and a squeezing rib projects from the other side.

6 Claims, 5 Drawing Sheets

(56) References Cited

U.S. PATENT DOCUMENTS

| | | | | |
|---|---|---|---|---|
| 5,390,876 | A * | 2/1995 | Hatano et al. | 248/73 |
| 5,494,245 | A * | 2/1996 | Suzuki et al. | 248/74.1 |
| 5,803,413 | A * | 9/1998 | Benoit et al. | 248/73 |
| 6,042,062 | A * | 3/2000 | Sugiyama | 248/65 |
| 6,682,026 | B2 * | 1/2004 | Nagayasu | 248/74.2 |
| 6,915,990 | B2 * | 7/2005 | Maruyama | 248/68.1 |
| 7,162,790 | B1 * | 1/2007 | Daniels | 29/525.01 |
| 7,387,282 | B2 * | 6/2008 | Kovac | 248/74.4 |
| 7,661,631 | B2 * | 2/2010 | Ibaraki | 248/73 |
| 8,013,248 | B2 * | 9/2011 | Sakata et al. | 174/68.1 |
| 8,672,276 | B2 * | 3/2014 | Fukumoto | 248/67.5 |
| 2003/0136884 | A1 * | 7/2003 | Miura | 248/68.1 |
| 2004/0065785 | A1 * | 4/2004 | Miura et al. | 248/62 |
| 2004/0140406 | A1 * | 7/2004 | Kanie | 248/73 |
| 2004/0188569 | A1 * | 9/2004 | Bauer | 248/68.1 |
| 2013/0056590 | A1 * | 3/2013 | Kennedy | 248/62 |

FOREIGN PATENT DOCUMENTS

| | | |
|---|---|---|
| JP | 2006-312409 | 11/2006 |
| JP | 2007-143309 | 6/2007 |
| JP | 2008-141822 | 6/2008 |
| JP | 2011-85164 | 4/2011 |

* cited by examiner

CLAMP

FIELD OF THE INVENTION

The present invention relates to a clamp. Specifically, the present invention relates to a clamp for attaching a pipe harness in which electric wires are inserted into a metal pipe to a vehicle body, in which an outer diameter tolerance of the metal pipe is absorbed and vibrations of the metal pipe and occurrence of abnormal noises are prevented.

BACKGROUND ART

In hybrid cars and electric cars, there are cases where electric wires connecting a battery and an inverter, or an inverter and a motor are inserted into a metal pipe to be wired. In JP 2006-312409A (Patent Document 1), pipe harness 100 is obtained by inserting electric wires 101 for connecting a battery and an inverter into a metal pipe 102, and the pipe harness 100 is attached to a vehicle body 104 (undersurface of a floor panel) through a bracket 103 shown in FIG. 5. The bracket 103 has an arm portion 103b protruding from a cylindrical portion 103a for being externally fitted to the metal pipe 102, and a plate-like attaching portion 103c protruding laterally from the upper end of the arm portion 103b, and the attaching portion 103c is fixed to the vehicle body 104 by bolting or welding.

Moreover, JP 2008-141822A (Patent Document 2) proposes a clamp (holder) for attaching a pipe to a vehicle body. In a clamp 106 made of a resin molded article, as shown in FIGS. 6(A) and 6(B), clamp portion 107 having a receiving recessed portion 107a for containing a pipe 105, and a lid portion 108 for closing an opening of the receiving recessed portion 107a are coupled with a hinge 109. A fixing portion 107d for being attached to the vehicle body (not shown) projects from the clamp portion 107. The clamp has a structure in which, when the lid portion 108 is closed by inserting a locking claw 108b provided on the lid portion 108 into a locking hole 107b provided on the clamp portion 107 and locking it thereto, a lever piece 108c provided on the lid portion 108 abuts against a lever piece receiving portion 107c provided on the clamp portion 107 and the inner diameter of the receiving recessed portion 107a is reduced. With this structure, the pipe 105 contained in the receiving recessed portion 107a of the clamp portion 107 is firmly held to prevent positional displacement of the pipe 105.

CITATION LIST

Patent Documents

Patent Document 1: JP 2006-312409A
Patent Document 2: JP 2008-141822A

SUMMARY OF THE INVENTION

Technical Problem

The inner diameter of the cylindrical portion 103a of the bracket 103 described in Patent Document 1 is set to a predetermined value adjusted to the size of the outer diameter of the metal pipe 102 for being inserted thereinto. Moreover, also in the clamp 106 described in Patent Document 2, when the lid portion 108 is closed, the inner diameter of the receiving recessed portion 107a is set to a predetermined value adjusted to the size of the outer diameter of the pipe 105 for being inserted thereinto. Meanwhile, variations are exhibited in the outer diameters of the pipes 102 and 105 for being inserted into the bracket 103 and the clamp 106 in the range of a predetermined tolerance even if they have the same size of the outer diameters. Some types of the pipes have a large outer diameter tolerance. The bracket 103 and the clamp 106 do not have the structures capable of absorbing the outer diameter tolerance, and therefore, if the pipe 102 and 105 having the outer diameters close to allowable lower limit values are inserted into the bracket 103 and the clamp 106 having the above-described configurations, there are cases where gaps are formed between the inner circumferential surfaces of the bracket 103 and the clamp 106 into which the pipe 102 and 105 are inserted, and the outer circumferential surfaces of the pipe 102 and 105, so that the pipe 102 and 105 vibrate and abnormal noises occur.

It is an object of the present invention to absorb an outer diameter tolerance of a metal pipe for being inserted into a clamp and prevent vibrations of the metal pipe and occurrence of abnormal noises.

Solution to Problem

To solve the above-described problems, the present invention provides a clamp made of a resin molded article for attaching a pipe harness in which electric wires are inserted into a metal pipe to a vehicle body, having a configuration in which a first portion and second portion having a pair of semicircular inner surfaces are coupled with a thin-walled hinge, a locking portion and a locked portion are provided on free ends of the first and the second portions, the locking portion and the locked portion being lockable to each other, clamping the metal pipe inserted between the semicircular inner surfaces of the first and the second portions, and a configuration in which an attaching hole into which an attaching member protruding from the vehicle body can be inserted and locked thereto is provided on the first portion, an opening is provided in part of a partition portion that separates the attaching hole and the semicircular inner surfaces, a swinging piece projects into the opening from part of a circumferential surface of the partition portion surrounding the opening, an attaching member contact projection is provided on one side of the swinging piece, and a squeezing rib projects from the other side, when the attaching member is inserted into the attaching hole the attaching member pushes against the attaching member contact projection and causes the squeezing rib to protrude to the semicircular inner surface side, and the squeezing rib is pushed against the metal pipe inserted along the semicircular inner surface, fixing the metal pipe.

As described above, in the clamp in which the first and the second portions having a pair of semicircular inner surfaces are coupled with the thin-walled hinge and the metal pipe of the pipe harness is inserted and clamped between the pair of semicircular inner surfaces, the opening is provided in the partition portion that separates the attaching hole of the first portion into which the attaching member protruding from the vehicle body is inserted and locked thereto and the semicircular inner surface, and the swinging piece projects to the opening from part of circumferential surfaces of the partition portion surrounding the opening. Moreover, the attaching member contact projection that is contacted and pressed by the attaching member when the attaching member on the vehicle body side is inserted into the attaching hole and locked thereto is provided on one side of the swinging piece, and the squeezing rib projects from the other side.

Accordingly, even if an outer diameter tolerance of the metal pipe for being inserted between the pair of the semicircular inner surfaces of the first and the second portions is relatively large and the outer diameter of the metal pipe is the allowable lower limit value, by merely inserting the attaching member on the vehicle body side into the attaching hole and locking it thereto, the attaching member contact projection of the swinging piece is pressed by the attaching member causing the squeezing rib to protrude toward the semicircular inner surface and the squeezing rib is pushed against the metal pipe, so that the metal pipe can be firmly fixed in the clamp.

That is, with the above-described configuration, the swinging piece for being pressed by the attaching member on the vehicle body side swings corresponding to the outer diameter of the metal pipe and allows the squeezing ribs to come into areal contact with the metal pipe, and therefore, an outer diameter tolerance of the metal pipe can be readily absorbed to prevent vibrations of the metal pipe and occurrence of abnormal noises. Since the load to the clamp is reduced by preventing vibrations of the metal pipe, the clamp is also prevented from breakage.

Moreover, since the metal pipe is fixed in the clamp without rattling by pushing the squeezing rib of the swinging piece against the metal pipe, the diameters of the pair of the semicircular inner surfaces of the first and the second portions can be set a little larger than the outer diameter of the metal pipe for being inserted thereinto. Accordingly, until the attaching member protruding from the vehicle body is inserted into the attaching hole of the clamp and locked thereto, it is possible to freely move the clamp in the axial direction of the metal pipe in accordance with the layout and the like of the vehicle body to change the position of the clamp. The attaching member is inserted into the attaching hole of the clamp and locked thereto, so that the position of the clamp can be fixed.

It is preferable that the swinging piece projects through a hinge from part of circumferential surfaces of the partition portion surrounding the opening in order to facilitate swinging. Moreover, it is preferable that the opening has a rectangular shape and the swinging piece projects through a hinge on a circumferential surface of the partition portion surrounding the opening, the circumferential surface being located in front of the opening with respect to the direction in which the attaching member to be inserted into the attaching hole and locked thereto is inserted.

It is preferable that the attaching member protruding from the vehicle body is a stud bolt, a locking piece for being locked to a groove of the stud bolt projects from the inner surface of the attaching hole, and the attaching member contact projection of the swinging piece is pushed by the outer circumferential surface of the stud bolt inserted into the attaching hole.

Moreover, the attaching member protruding from the vehicle body may be a bracket in which a locking hole is provided, a locking claw for being inserted into the locking hole and locked thereto may project from the inner surface of the attaching hole having a shape allowing the bracket to be inserted thereinto, and the attaching member contact projection of the swinging piece may be pushed by the outer circumferential surface of the bracket inserted into the attaching hole.

It is preferable that a plurality of the squeezing ribs provided on the swinging piece protrudes in parallel from a substrate of the swinging piece, the squeezing ribs protrude in V-shape toward respective tips, and the tips are squeezed by the metal pipe pressed against them.

As described above, the plurality of the parallel squeezing ribs protrudes in V-shape toward the tips to allow the tips of the squeezing ribs to be easily squeezed and to come into highly areal contact with the metal pipe.

Moreover, it is preferable that the visible outlines of the tips of the plurality of the squeezing ribs have an arc shape in order to allow the squeezing ribs to come into areal contact with the arc-shaped outer peripheral line of the metal pipe.

It is preferable that the protruding amount of the squeezing ribs is set so that the squeezing ribs are pushed against the metal pipe, so that the metal pipe can be fixed even if the outer diameter of the metal pipe to be inserted between the pair of the semicircular inner surfaces of the first and the second portions is the allowable lower limit value.

It is preferable that the locked portions comprising locking frames are provided on both lateral sides of the free end of the first portion, and the locking portions comprising locking claws for being inserted into the locking frames and locked thereto are provided on both lateral sides of the free end of the second portion.

It is preferable that the clamp attaches the pipe harness for being arranged under a floor of a hybrid car or an electric car to an undersurface of a floor panel, and that the electric wires of the pipe harness connect a battery and an inverter, or an inverter and a motor.

Advantageous Effects of the Invention

As described above, in the present invention, the clamp in which the first and the second portions having a pair of semicircular inner surfaces are coupled with the thin-walled hinge and the metal pipe of the pipe harness is inserted and clamped between the pair of semicircular inner surfaces has a configuration in which the opening is provided in the partition portion that separates the attaching hole of the first portion into which an attaching member protruding from the vehicle body is inserted and locked thereto and the semicircular inner surface, and the swinging piece projects to the opening from part of circumferential surfaces of the partition portion surrounding the opening. Moreover, the clamp has a configuration in which the attaching member contact projection that is contacted and pressed by the attaching member when the attaching member on the vehicle body side is inserted into the attaching hole and locked thereto are provided on one side of the swinging piece, and the squeezing ribs project from the other side. Accordingly, even if an outer diameter tolerance of the metal pipe for being inserted between the pair of the semicircular inner surfaces of the first and the second portions is relatively large and the outer diameter of the metal pipe is the allowable lower limit value, by merely inserting the attaching member on the vehicle body side into the attaching hole and locking it thereto, the attaching member contact projection of the swinging piece is pressed by the attaching member causing the squeezing rib to protrude toward the semicircular inner surface and the squeezing rib is pushed against the metal pipe, so that the metal pipe can be firmly fixed in the clamp.

That is, with the above-described configuration, the swinging piece for being pressed by the attaching member on the vehicle body side swings corresponding to the outer diameter of the metal pipe and allows the squeezing ribs to come into areal contact with the metal pipe, and therefore, an outer diameter tolerance of the metal pipe can be readily absorbed to prevent vibrations of the metal pipe and occurrence of abnormal noises. Because the load to the clamp is reduced by preventing vibrations of the metal pipe, the clamp is also prevented from breakage.

BRIEF DESCRIPTION OF DRAWINGS

FIG. 1(A) shows the clamp in an open state, and FIG. 1(B) shows the clamp in a closed state.

FIG. 4(A) is a perspective view showing a state in which a bracket is about to be inserted into the attaching hole of the clamp, and FIG. 4(B) is a plan view of the clamp.

FIG. 6(A) is a cross-sectional view of the lid portion in an open state, and FIG. 6(B) is a cross-sectional view of the lid portion in a closed state.

DESCRIPTION OF EMBODIMENTS

Hereinafter, embodiments of the present invention will be described with reference to the accompanying drawings.

Figure 1:
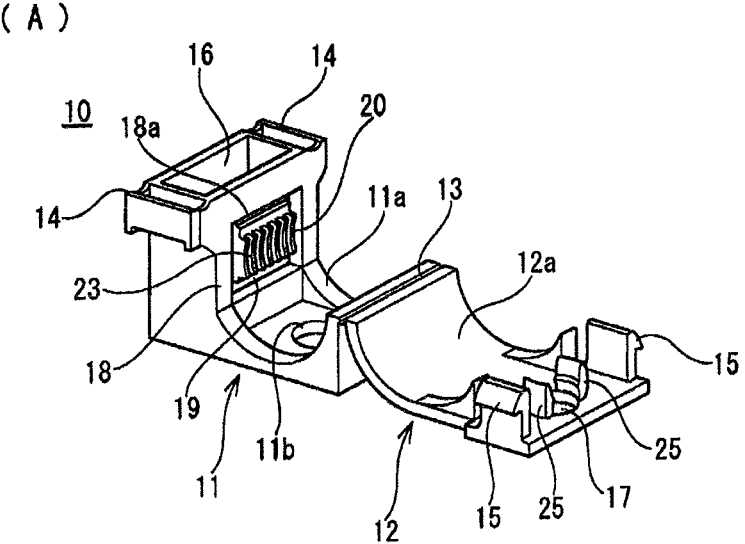
FIGs. 1(A) and 1(B) are perspective views of a clamp of the first embodiment.
Figure 1:
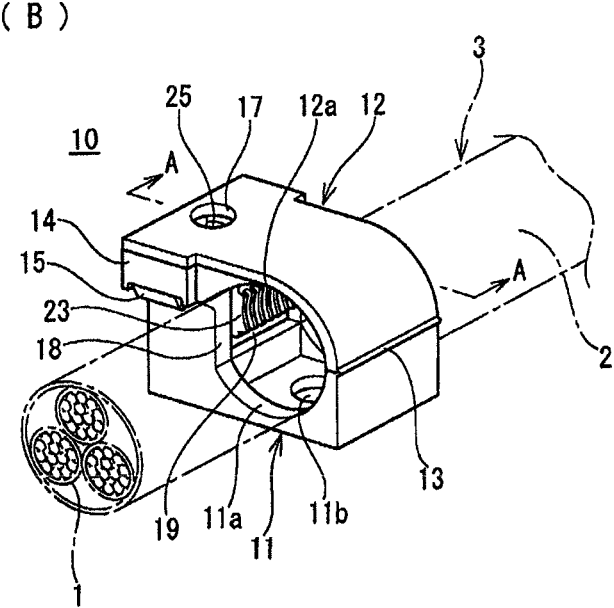
Figure 2:
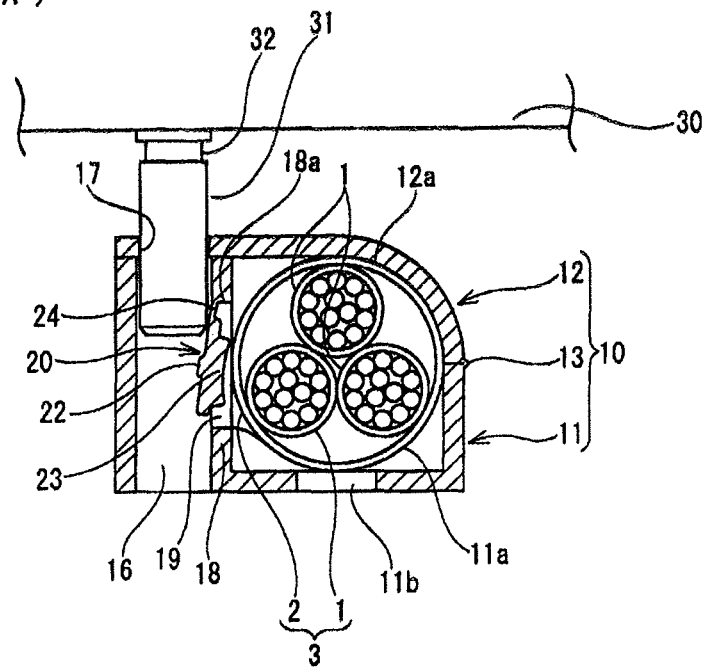
FIG. 2(A) is a sectional view taken along line A-A showing a state in which a stud bolt is being inserted into an attaching hole of the clamp.
FIG. 2(B) is a sectional view taken along line A-A showing a state in which the stud bolt is inserted into the attaching hole of the clamp and locked thereto.
Figure 2:
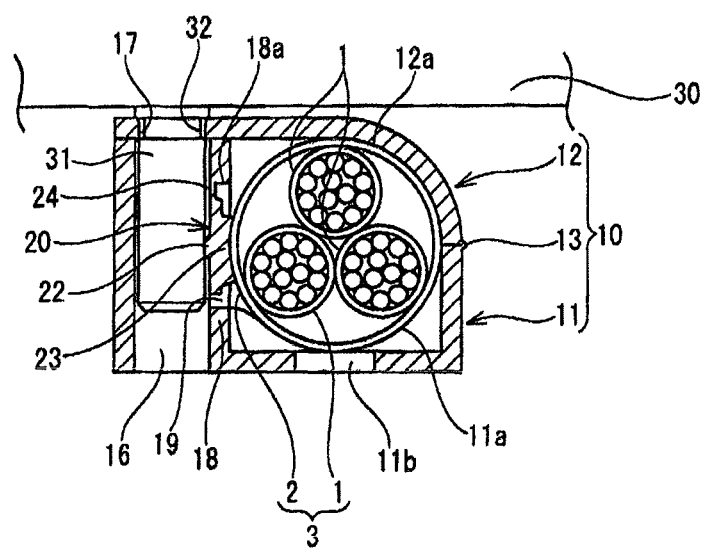
Figure 3:
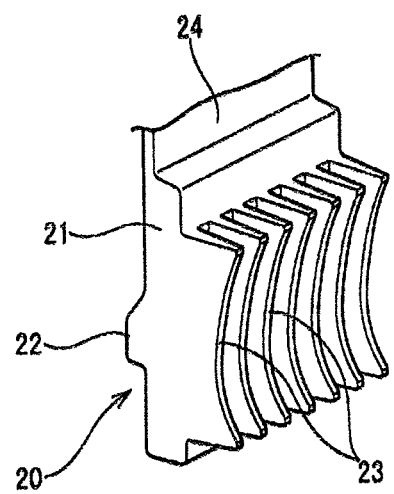
FIG. 3 is an enlarged view of the main part of a swinging piece.

FIGS. 1 to 3 show a first embodiment. In the present embodiment, a battery and an inverter (not shown) of a hybrid car are connected with three electric wires 1. A pipe harness 3 is formed by inserting the electric wires 1 into a metal pipe 2 formed of aluminum based metal, and the pipe harness 3 is attached to the undersurface of a floor panel 30 of the vehicle body through a clamp 10.

As shown in FIG. 1 and FIG. 2, the clamp 10 made of a resin molded article includes a first portion 11 and a second portion 12 having semicircular inner surfaces 11a and 12a, respectively, and one end of the first portion 11 and one end of the second portion 12 are openably and closably coupled with a thin-walled hinge 13. Moreover, locked portions 14 and locking portions 15 that are locked to each other are provided on both lateral sides of respective free ends, which are the other ends of the first and the second portions 11 and 12. The locked portions 14 provided on the first portion 11 each include a locking frame, and the locking portions 15 provided on the second portion 12 are each constituted by a locking claw that is locked to the locked portion 14 including the locking frame.

In the clamp 10 of the present embodiment, the pipe harness 3 is inserted between the pair of semicircular inner surfaces 11a and 12a of the first and the second portions 11 and 12, and the locking portions 15 of the second portion 12 are locked to the locked portions 14 of the first portion 11, so that the pipe harness 3 is clamped by the clamp 10. Moreover, the clamp 10 into which the pipe harness 3 is inserted and clamped has a structure in which the clamp 10 is fixed to an attaching member protruding from the undersurface of the floor panel 30. In the present embodiment, as shown in FIG. 2, the attaching member is a stud bolt 31 protruding by welding from the undersurface of the floor panel 30.

Attaching holes 16 and 17 into which the stud bolt 31 is inserted and locked thereto are provided in the central position of the free ends of the first and the second portions 11 and 12.

The free end of the second portion 12 that is arranged so as to face the undersurface of the floor panel 30 has a plate shape, and the attaching hole 17 of the second portion 12 has a circular shape matching the cross-sectional shape of the stud bolt 31. Moreover, a pair of locking pieces 25 to be locked to a groove 32 of the stud bolt 31 projects from the inner circumferential surface of the attaching hole 17 so as to face each other.

Meanwhile, the attaching hole 16 of the first portion 11 is a rectangular parallelepiped attaching hole communicating with the attaching hole 17 of the second portion 12. A rectangular opening 19 is provided in part of a partition portion 18 that separates the attaching hole 16 and the semicircular inner surface 11a. A swinging piece 20 projects into the opening 19 through a hinge 24 on a circumferential surface 18a of the partition portion 18 surrounding the opening 19, the circumferential surface 18a being located in front of the opening 19 with respect to the direction in which the stud bolt 31 is inserted.

As shown in FIGS. 1 to 3, attaching member contact projections 22 are provided on one side of a substrate 21 of the swinging piece 20, and a plurality of parallel squeezing ribs 23 projects from the other side. The attaching member contact projections 22 protrude to the attaching hole 16 side so that it is pressed by the outer circumferential surface of the stud bolt 31 that is inserted into the attaching hole 16. Moreover, the stud bolt 31 pushes the attaching member contact projections 22, so that the plurality of parallel squeezing ribs 23 protrudes to the semicircular inner surface 11a side and the squeezing ribs 23 are pushed against the metal pipe 2 of the pipe harness 3 that is inserted between the pair of the semicircular inner surfaces 11a and 12a. Furthermore, the plurality of parallel squeezing ribs 23 protrudes in V-shape from the substrate 21 toward respective tips to allow the tips of the squeezing ribs 23 to be easily squeezed by the metal pipe 2 pressed against them. Moreover, the visible outline of the tip of the squeezing ribs 23 has an arc shape in order to allow the squeezing ribs 23 to come into areal contact with the metal pipe 2 having an arc-shaped outer peripheral line, and the protruding amount of the squeezing ribs 23 is set so that the squeezing ribs 23 are pushed against the metal pipe 2, so that the metal pipe 2 can be fixed without rattling even if the outer diameter of the metal pipe 2 to be inserted between the pair of the semicircular inner surfaces 11a and 12a is the allowable lower limit value. Meanwhile, a draining hole 1ib is provided in the first portion 11 and is arranged so as to face a road surface.

Hereinafter, attachment of the clamp 10 will be described.

First, five to seven of the clamps 10 shown in FIG. 1 are spaced apart and attached at predetermined positions of the pipe harness 3 to be provided on the undersurface of the floor panel 30. Specifically, the pipe harness 3 is arranged on the semicircular inner surface 11a of the first portion 11 of the clamp 10 in an open state as shown in FIG. 1(A), and the first and the second portions 11 and 12 are closed as shown in FIG. 1(B) to lock the locking portion (locking claw) 15 of the second portion 12 to the locked portion (locking frame) 14 of the first portion 11. Thereby, the pipe harness 3 is inserted and clamped between the pair of semicircular inner surfaces 11a and 12a.

Next, as shown in FIG. 2, the stud bolt 31 protruding from the undersurface of the floor panel 30 is inserted into the attaching holes 17 and 16 of the second and the first portions 12 and 11 of the clamp 10 into which the pipe harness 3 is inserted and locked thereto. When the stud bolt 31 is inserted into the attaching hole 16, the attaching member contact projections 22 of the swinging piece 20 protruding to the attaching hole 16 side as shown in FIG. 2(A) are pushed by the outer circumferential surface of the stud bolt 31, so that the squeezing ribs 23 protrude to the semicircular inner surface 11a side. The squeezing ribs 23 are pushed against the metal pipe 2 of the pipe harness 3 as shown in FIG. 2(B), fixing the metal pipe 2 in the clamp 10. The locking piece 25 projecting from the inner surface of the attaching hole 17 is locked to the groove 32 of the stud bolt 31 to accomplish the attachment of the clamp 10 to the floor panel 30.

In the clamp 10 of the present embodiment, even if an outer diameter tolerance of the metal pipe 2 for being inserted between the pair of the semicircular inner surfaces 11a and 12a of the first and the second portions 11 and 12 is relatively large and the outer diameter of the metal pipe 2 is the allowable lower limit value, by merely inserting the stud bolt 31 into the attaching holes 16 and 17 and locking it thereto, the attaching member contact projections 22 of the swinging piece 20 are pressed by the outer circumferential surface of the stud bolt 31 causing the squeezing ribs 23 to protrude toward the semicircular inner surface 11a and the squeezing ribs 23 are pushed against the metal pipe 2, so that the metal pipe 2 can be firmly fixed in the clamp 10.

That is, with the clamp 10 of the present embodiment, the swinging piece 20 to be pressed by the stud bolt 31 swings corresponding to the outer diameter of the metal pipe 2 and allows the squeezing ribs 23 to come into areal contact with the metal pipe 2, and therefore, an outer diameter tolerance of the metal pipe 2 can be readily absorbed to prevent vibrations of the metal pipe 2 and occurrence of abnormal noises. Since the load to the clamp 10 is reduced by preventing vibrations of the metal pipe 2, the clamp 10 is also prevented from breakage.

Moreover, since the squeezing ribs 23 of the swinging piece 20 are pushed against the metal pipe 2, so that the metal pipe 2 can be fixed in the clamp 10 without rattling, the diameters of the pair of the semicircular inner surfaces 11a and 12a of the first and the second portions 11 and 12 can be set a little larger than the outer diameter of the metal pipe 2. Accordingly, until the stud bolt 31 is inserted into the attaching holes 17 and 16 of the clamp 10 and locked thereto, it is possible to freely move the clamp 10 in the axial direction of the metal pipe 2 in accordance with the layout and the like of the vehicle body to change the position of the clamp 10. The stud bolt 31 is inserted into the attaching holes 17 and 16 of the clamp 10 and locked thereto, so that the position of the clamp 10 can be fixed.

Figure 4:
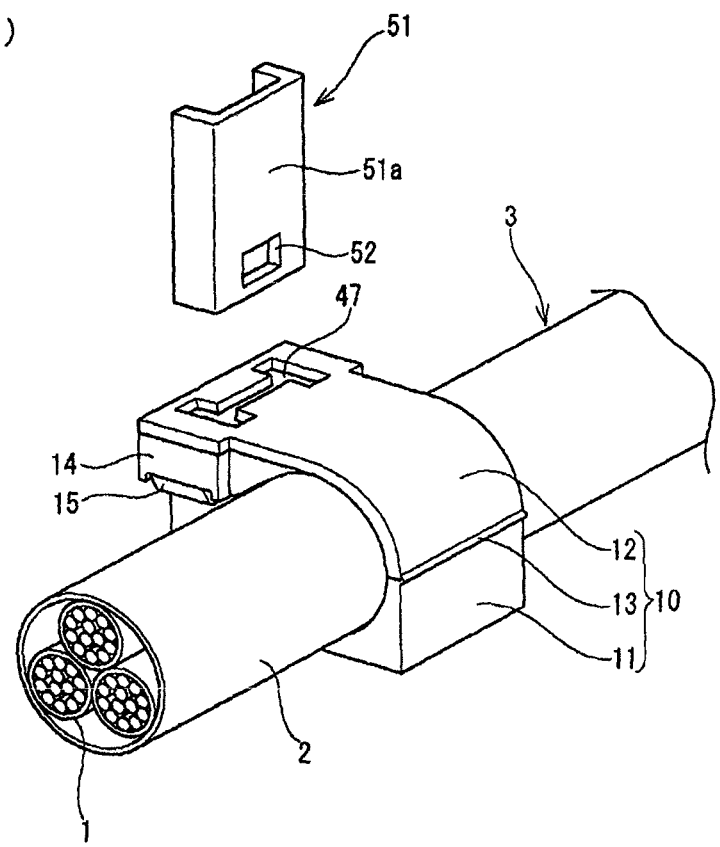
FIGS. 4(A) and 4(B) show a clamp of the second embodiment.
Figure 4:
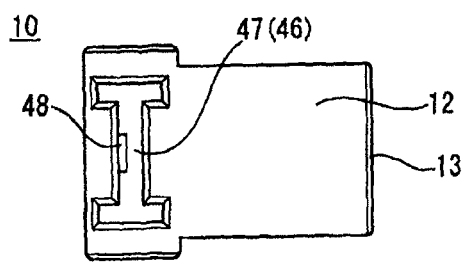
Figure 5:
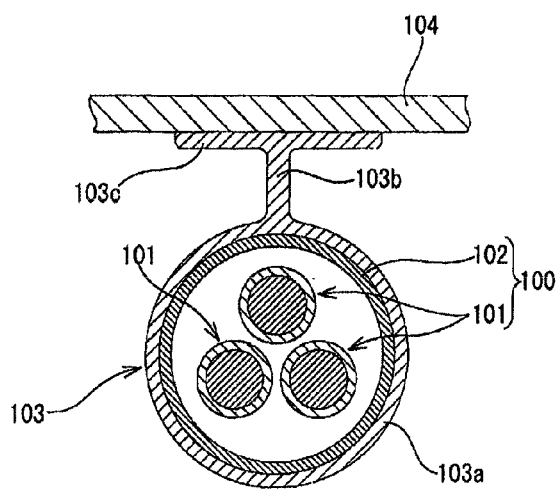
FIG. 5 is a drawing of a conventional example.
Figure 6:
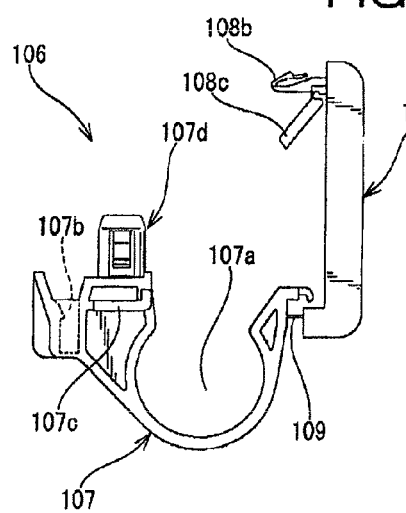
FIGS. 6(A) and 6(B) show a conventional example.
Figure 6:
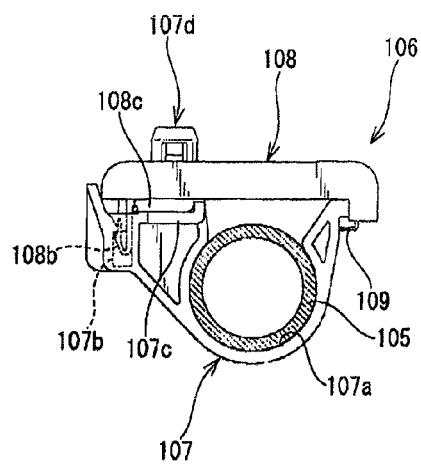

FIG. 4 show a second embodiment.

In the second embodiment, an attaching member protruding from the floor panel 30 is a bracket 51 as shown in FIG. 4. The bracket 51 has a plate-shaped central portion 51a and a U-shaped cross-section. Moreover, an attaching hole 47 of the second portion 12 of the clamp 10 has a shape allowing the bracket 51 for being inserted thereinto, and an attaching hole 46 of the first portion 11 communicating with the attaching hole 47 of the second portion has a same rectangular parallelepiped shape as that of the first embodiment. A locking hole 52 is provided in the central portion 51a of the bracket 51. A locking claw 48 to be inserted into the locking hole 52 and locked thereto projects from the inner surface of the attaching hole 46 of the first portion. Moreover, the second embodiment has a structure in which attaching member contact projections (not shown) of a swinging piece are pressed by the outer surface of the central portion 51a when the bracket 51 is inserted into the attaching hole 46 of the first portion. Other aspects are same as the first embodiment.

Also in the second embodiment, the swinging piece that is pressed by the outer surface of the central portion 51a of the bracket 51 swings corresponding to the outer diameter of the metal pipe 2 and allows the squeezing ribs to come into areal contact with the metal pipe 2, and therefore, an outer diameter tolerance of the metal pipe 2 can be readily absorbed to prevent vibrations of the metal pipe 2 and occurrence of abnormal noises.

Reference Signs List
  1 Electric wire
  2 Metal pipe
  3 Pipe harness
  10 Clamp
  11 First portion
  12 Second portion
  11a, 12a Semicircular inner surface
  13 Thin-walled hinge
  14 Locked portion
  15 Locking portion
  16, 17, 46, 47 Attaching hole
  18 Partition portion
  19 Opening
  20 Swinging piece
  21 Substrate
  22 Attaching member contact projection
  23 Squeezing rib
  25 Locking piece
  48 Locking claw
  30 Floor panel
  31 Stud bolt
  32 Groove
  51 Bracket
  52 Locking hole

The invention claimed is:

1. A clamp comprising a resin molded article configured for attaching a pipe harness in which electric wires are inserted into a metal pipe to a vehicle body,
    the clamp including a first portion and a second portion having a pair of semicircular inner surfaces coupled with a thin-walled hinge, and a locking portion and a locked portion provided on free ends of the first and the second portions, the locking portion and the locked portion configured to be lockable to each other, clamping the metal pipe inserted between the semicircular inner surfaces of the first and the second portions; and
    wherein an attaching hole into which an attaching member protruding from the vehicle body can be inserted and locked thereto is provided on the first portion, an opening is provided in part of a partition portion that separates the attaching hole and the semicircular inner surfaces, a swinging piece projects into the opening from part of a circumferential surface of the partition portion surrounding the opening, an attaching member contact projection is provided on one side of the swinging piece, and a squeezing rib projects from the other side of the swinging piece,
    the clamp being configured such that when the attaching member is inserted into the attaching hole the attaching member pushes against the attaching member contact projection and causes the squeezing rib to protrude toward the semicircular inner surface side, and the squeezing rib is pushed against the metal pipe inserted along the semicircular inner surface, fixing the metal pipe.

2. The clamp according to claim 1, wherein the attaching member protruding from the vehicle body is a stud bolt, a locking piece configured to be locked to a groove of the stud bolt projects from the inner surface of the attaching hole, and the attaching member contact projection of the swinging piece is pushed by the outer circumferential surface of the stud bolt inserted into the attaching hole.

3. The clamp according to claim 1, wherein the attaching member protruding from the vehicle body is a bracket in which a locking hole is provided, a locking claw configured to be inserted into the locking hole and locked thereto projects from the inner surface of the attaching hole having a shape allowing the bracket to be inserted thereinto, and the attaching member contact projection of the swinging piece is pushed by the outer circumferential surface of the bracket inserted into the attaching hole.

4. The clamp according to claim 1, wherein a plurality of the squeezing ribs provided on the swinging piece protrude in parallel from a substrate of the swinging piece, the squeezing ribs protrude in V-shape toward respective tips, and the tips are squeezed by the metal pipe pressed against them.

5. The clamp according to claim 1, wherein the locked portion comprises locking frames provided on both lateral sides of the free end of the first portion, and the locking portion comprises locking claws configured to be inserted into the locking frames and locked thereto provided on both lateral sides of the free end of the second portion.

6. The clamp according to claim 1 for attaching the pipe harness arranged under a floor of a hybrid car or an electric car to an undersurface of a floor panel.

* * * * *